United States Patent
Jousse

(10) Patent No.: US 6,991,125 B2
(45) Date of Patent: Jan. 31, 2006

(54) GLASS FRAME

(75) Inventor: Didier Jousse, Taverny (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/272,367

(22) Filed: Oct. 17, 2002

(65) Prior Publication Data

US 2003/0080122 A1    May 1, 2003

Related U.S. Application Data

(63) Continuation of application No. PCT/FR01/00871, filed on Apr. 4, 2001.

(30) Foreign Application Priority Data

Apr. 17, 2000    (FR) .................................. 00 04949

(51) Int. Cl.
*H01J 61/30* (2006.01)

(52) U.S. Cl. .................................................. 220/2.1 R
(58) Field of Classification Search ............. 220/2.1 R; 317/238

See application file for complete search history.

(56) References Cited

U.S. PATENT DOCUMENTS

| | | | | |
|---|---|---|---|---|
| 4,930,418 A | * | 6/1990 | Folsom | ........................ 102/201 |
| 5,027,574 A | * | 7/1991 | Phillip | ........................ 52/171.3 |
| 5,561,343 A | | 10/1996 | Lowe | .......................... 313/482 |
| 5,643,644 A | | 7/1997 | Demars | ........................ 428/34 |
| 5,644,894 A | * | 7/1997 | Hudson | .................... 52/786.13 |
| 5,698,277 A | * | 12/1997 | Schueller et al. | ............. 428/34 |
| 5,721,050 A | | 2/1998 | Roman et al. | ............... 428/397 |
| 5,851,133 A | | 12/1998 | Hofmann | ...................... 445/24 |
| 5,910,703 A | | 6/1999 | Kuo et al. | .................. 313/482 |
| 6,172,454 B1 | | 1/2001 | Hofmann | ..................... 313/495 |
| 6,387,460 B1 | * | 5/2002 | Shukuri et al. | ............... 428/34 |
| 6,420,002 B1 | * | 7/2002 | Aggas et al. | .................. 428/34 |

FOREIGN PATENT DOCUMENTS

| | | |
|---|---|---|
| CA | 2166506 | 8/1996 |
| EP | 0 616 354 A2 | 9/1994 |
| EP | 0 627 389 A2 | 12/1994 |
| EP | 0 645 516 A2 | 3/1995 |
| EP | 0 725 418 A1 | 8/1996 |
| EP | 0 881 656 A1 | 12/1998 |
| FR | 2 806 075 | 9/2001 |
| GB | 2085108 A * | 4/1982 |
| JP | 5-216416 A * | 2/1992 |

OTHER PUBLICATIONS

Translation of HS - 216416 Japanese reference Aug. 27, 1993.

* cited by examiner

*Primary Examiner*—Stephen Castellano
(74) *Attorney, Agent, or Firm*—Oblon, Spivak, McClelland, Maier & Neustadt, P.C.

(57) ABSTRACT

A glass frame includes a cross-section that has a substantially polygonal profile with at least one re-entrant angle, and is intended to keep two plane substrates separate around their periphery. The frame may keep a space between two glass sheets, such as in the production of plane and hermetically sealed glass envelopes for use as field-emission screens.

37 Claims, 4 Drawing Sheets

GLASS FRAME

CROSS-REFERENCE TO RELATED APPLICATIONS

This application is a continuation of the U.S. National Stage designation of co-pending International Patent Application PCT/FR01/00871, filed Apr. 4, 2001, the entire contents of which are expressly incorporated herein by reference thereto.

FIELD OF THE INVENTION

The invention relates to a glass frame intended to keep two plane substrates separate around their periphery.

BACKGROUND OF THE INVENTION

Although not limited to such applications, the invention will be more particularly described with reference to frames used for keeping a space between two glass sheets in the production of plane and hermetically sealed glass envelopes, such as field-emission screens, and therefore for keeping a space of constant, but not limited, thickness of generally less than a few millimeters around the periphery of the glass sheets.

Such a configuration is widely used for the production of display screens. These may be field-emission display (FED) screens having cathodes consisting of carbon microspikes or nanotubes or screens of the flat cathode-ray tube (flat CRT) type. Such a configuration may also be desirable for producing vacuum glazing or plane lamps. The expression plane lamps should be understood to mean those encompassing lamps used in the manufacture of portable computers and larger-sized lamps for the production of advertising panels or partitions, for example in offices, whatever the technology used for these lamps.

In a screen of the field-emission type, a limited space, in which a vacuum is created, must be maintained between the two glass sheets. It is therefore necessary around the periphery of the screen to provide means which make it possible to define and maintain this space and which furthermore seal the volume thus formed by the glass sheets and these peripheral means.

It is known, for example for the production of vacuum double glazing as described in Patent Application EP-A-0 645 516, to provide an enamel-type sealing paste deposited to the desired thickness around the periphery of the two glass sheets in order to join them together, sealing the space defined between the two glass sheets; the thickness and the hardness of the enamel obtained after firing the latter enable it to help to keep the desired thickness of the vacuum layer produced between the two glass sheets. Although such a construction is possible if the desired height of the space created between the two glass sheets does not exceed 0.5 mm, above this value it is no longer possible to guarantee a perfect seal, especially in the case of industrial production. And, in the production of field-emission screens, the said height is at least 0.7 mm.

A technique currently used for producing the peripheral element, starting from a glass sheet having the desired thickness for the said element, consists in producing a frame whose edges have a width of the order of one centimeter. To do this, the central part of the glass sheet is cut out and removed. It is then possible to join the glass sheet thus obtained to the two glass sheets constituting the faces of the screen by means of an enamel paste or sealing frit which fulfils the sealing function. Although this construction is satisfactory from a technical standpoint, it has various drawbacks in its implementation. Firstly, such glass frames must be produced before the screen is manufactured, and this requires handling of the screens, which is not simple because they are fragile. To remedy this and at the very least to reduce the risk of breakage, the width of the edges is made large enough to increase the stiffness of the frame. However, this stiffening is achieved to the detriment of the final viewing area for a given screen size, since the frame will encroach on this viewing area. Furthermore, such frames are relatively costly to obtain because of the loss of material occasioned by the central recess of the glass sheet from which these frames are cut. Finally, this technique is limited to the production of frames having a rectangular cross-section, in particular preventing the frame from being given other functionalities useful for improving the performance of the final product.

The invention thus relates to means making it possible to define and maintain a space between two plane substrates, which help to seal the volume bounded by the substrates, and the means being at least equivalent in terms of technical results to the latter solution presented above and which advantageously do not have the drawbacks of the above-mentioned solutions. Advantageously, they should be able to be produced in all thicknesses corresponding to the applications described above and for costs lower than those mentioned above. Furthermore, the dimensions of these means should be smaller than the latter technique mentioned above so as to optimize the viewing area of the end product, for example a screen.

The invention also relates to a glass frame whose cross-section has a substantially polygonal profile that includes at least one re-entrant angle.

SUMMARY OF THE INVENTION

A glass screen according to the present invention is able to fulfil the role of peripheral spacer and help to seal the volume lying between, for example, two plane glass substrates forming a screen. A cross-section that includes a re-entrant angle will make it possible, in particular, for reasons that will be discussed, to stiffen the frame with side widths less than those used in the prior art. Within the definition of the frame according to the invention, it should be understood that the polygonal cross-section which includes at least one re-entrant angle is not necessarily constant over the entire periphery. Furthermore, the expression "substantially polygonal profile" should be understood to mean that the segments of the polygon may be replaced by curves.

According to a preferred embodiment of the invention, the frame has the shape of a parallelogram and each of its sides has a constant cross-section. Also, the frame according to the invention preferably includes at least four profiled glass elements, which advantageously correspond to each of the sides of the frame.

Such profiled glass elements may especially be produced using a technique as described in document EP-0 627 389 A. That document describes a process in which a preform or glass rod is drawn with a cross-section substantially identical in shape, to within a homothetic ratio, to that which it is desired to obtain. This preform, which has a sufficiently large size, for example, may be machined very accurately to the desired cross-section. In addition, this preform may be initially polished on its lateral faces. The drawing step takes place by raising the temperature of the preform to a temperature close to its softening temperature and the actual drawing can then be carried out in one or more steps.

The drawn rod obtained after drawing the preform has a cross-section similar in shape to that of the preform to within a homothetic ratio, which corresponds to the cross-section of the desired sides of the frame. Moreover, the rod has a polished appearance on its lateral faces owing to it being heated to a high temperature which creates a "fire polish". This phenomenon makes it possible to use a preform that is not polished on its lateral faces but has another appearance, such as a "fine-ground" appearance, in so far as a polished appearance is desired. The expression "fire polish" is understood to mean, according to the invention, a surface roughness (RMS value) of less than 5 Å measured by AFM (atomic force microscope) over a scanned surface of about 6 $\mu$m. This roughness is advantageously about 2 Å.

Next, the rods may be gathered together in a parallel manner. Preferably, these rods are gathered together in a cylinder, especially a gas cylinder, and are consolidated by means of a binder such as a wax or adhesive.

The assembly of rods is then cut to the desired length to form the sides of the desired frame; of course, this operation must be carried out for each of the lengths of elements needed for the production of the screen.

Having obtained the desired length, all of the sides may be ground and then optionally polished at the two ends. It is thus possible to obtain profiled elements polished on all their faces. In addition, if the cutting is not very precise, it is possible to fix the length of the elements during polishing.

The elements are then separated from one another especially by melting the binder or by chemical dissolution.

According to a variant of this process, the frame elements are made to the desired dimensions directly, one by one, by cutting out the rigid rods or profiled elements resulting from the drawing step.

The process thus described makes it possible to obtain elements with precise dimensions and for a lower cost, the process itself being inexpensive and there being no loss of material.

The elements according to the invention can also be produced using an extrusion method or a pultrusion method. In the first method, the necessary preform is produced before drawing, using extrusion techniques, and in drawing the preform using the technique described above. Pultrusion involves drawing the preform directly as it exits an extruder. In these techniques, it appears to be unnecessary to polish the faces of the preform, a satisfactory polished appearance of the faces of the spacers being maintained after drawing. A final variant for producing these profiled elements involves obtaining them directly by extrusion without any subsequent drawing.

Moreover, the elements obtained according to these manufacturing methods are such that the vertices of the polygonal cross-section are, because of the drawing process, rounded with a radius of curvature of between 2 and 50 microns and preferably between 5 and 20 microns. These rounded vertices make it possible, particularly for certain applications, to reduce the risk of damaging the glass sheets and possibly the layers deposited on their surfaces in the case of sliding, for example when putting the elements in place.

The pultrusion process also dispenses with an intermediate step, especially that of storing preforms, with continuous feeding of the extruder resulting in continuous manufacture of the elements for a given cross-section.

According to an exemplary embodiment of the invention, two adjacent profiled elements have complementary shapes allowing them to be fitted together, for example for a fitting of the mortise-and-tenon type. This means, for example, that a frame has two profiled elements making a tenon and of two profiled elements making a mortise, which will be joined together to form a frame.

Advantageously, the corners of the frame according to the invention are partly formed by angle brackets associated with the profiled elements. These angle brackets stiffen the frame and especially prevent any risk of it deforming.

Such angle brackets may be made of any material, but preferably are made of glass. Such angle brackets may especially be produced using the techniques described above for manufacturing the profiled elements; it is in fact possible to produce these glass angle brackets using a preform-drawing technique or else using extrusion or pultrusion techniques. In all cases, the angle bracket corresponds either to the drawing cross-section or to the extrusion cross-section.

According to an embodiment variant of the invention, the profiled elements are joined together exclusively by means of the angle brackets, that is to say the profiled elements are not combined directly by fitting.

Advantageously, according to the invention the glass composition of which the profiled elements are composed is chosen to be similar to that of the glass substrates forming the two plane surfaces intended to be joined together by the frame.

Advantageously, according to another type exemplary embodiment of the invention, the glass composition of the profiled elements is chosen to have a melting point below that of the other constituent parts of the product to be produced and preferably less than 500° C.; it is thus possible to seal the frame to the plane substrates by slightly melting the frame. The frame then acts as a seal. Such a composition may, for example, be chosen from sealing frit compositions normally used in the glass industry. It is also possible, according to embodiment variants, to incorporate elements into this composition which make it possible to raise its temperature without having to heat the entire product; for example, colorants which absorb infrared or laser radiation may be used. Also, elements may be used such as those described in French Patent Application FR 00/02936, which make the glass electronically conducting and therefore permit the temperature to be raised by a microwave radiation effect.

The choice of electronically conducting glass compositions as described in Application FR 00/02936 may furthermore allow the size of the viewing area of a screen to be optimized for a given overall size; this is because choosing a sufficiently high resistivity can result in leakage currents between the anode and cathode such that the frame can be very close to the pixels forming the viewing area.

With regard to the production of glass angle brackets according to the invention, their composition is chosen to be similar to that for the profiled elements. However, the choice made for the profiled elements may dictate the choice for the angle brackets; for example, if the profiled elements are made from compositions having a low melting point, in order to allow the frame to seal onto the plane substrates, it may be judicious to choose the same material for the angle brackets.

Moreover, in a preferred embodiment the angle brackets are made from a composition having a low melting point and preferably having a melting point of less than 500° C., whatever the composition of the profiled elements. Such an embodiment will make it possible, when melting the angle brackets, to guarantee that a seal is created at the junction with the two profiled elements, with the molten glass of an angle bracket penetrating, by capillary effect, the contact area between the two elements. The angle brackets may be melted either by a local supply of heat, or by heating the angle brackets by radiation, when they are sensitive thereto, or by conduction through contact with the profiled elements, which may be heated by radiation when they are chosen to be sensitive to such radiation.

According to an advantageous embodiment of the invention, the frame includes at least one recess over at least part of the length of at least one side.

One purpose of such a configuration is to be able to insert the angle brackets so that they are incorporated into the profiled elements. For this purpose, such a recess may be provided towards the outside of the frame or towards the inside, that is to say the frame formed by the combination of the profiled elements has one or more recesses around its periphery which face towards the inside or towards the outside of the frame.

The recess or recesses provided in the frame may have other benefits or may allow other elements to be inserted, especially those independent of the construction of the frame. They may, for example, in the case of one or more recesses facing the inside of the frame, be elements involved in the operation of the product. For example, in the case of products whose proper operation requires a high level of vacuum, such as FED or flat CRT screens, it is necessary to provide getters within the screen so that a high level of vacuum may be maintained throughout the lifetime of the screen, for example ten years. According to the invention, it is possible to introduce these getters into the recesses provided in the frame. This is possible whatever their mode of presentation, as agglomerated powder, as pills, as wires, in the form of plane sheets, etc. Furthermore, compared with the usual techniques, such an embodiment according to the invention makes it possible to further optimize the viewing area of this screen since the getters are positioned in the frame and therefore do not take up additional space. A final advantage of such an embodiment is that the getters can be uniformly distributed around the entire periphery, thereby improving their effectiveness.

Internal recesses may also allow the simple fitting and fixing of a metal or semi-conducting or partially metallic grid, or else a grid made of an insulating material metallized on the surface, in order, for example, to bias a discharge in the case of a plane lamp or to accelerate electrons in the case of VFD screens or to focus electrons in the case of FED screens. Fixing such grids into the frame according to the method provided by the invention furthermore makes it possible to position them without the use of other elements.

The outer recesses, apart from the possibility of fitting angle brackets, can also be used to house other functional elements used either in the production of the frame or in the production of the product, such as a screen. These may, for example, be mechanical means which make it possible, such as by hooping, to stiffen the frame formed by the profiled elements, especially when these are not combined together by means of angle brackets. In a variant, the outer recess is used to insert metal tools in the corners of the frame, these tools having a geometry suitable for acting both as the fasteners and as elements which guarantee that the upper and lower glass sheets are in alignment during the sealing operation. There may also be means which are used subsequently to raise the local temperature, for example in the form of a heating wire which is sufficiently rigid itself at the same time to increase the mechanical stiffness of the frame. In a variant, tooling consisting of two heating forks grips the frame elements and, during the sealing cycle, acts in the manner of a soldering iron. It is also possible to insert materials sensitive to infrared, laser or microwave radiation into these recesses, again to raise the temperature; it should be noted that the recesses for receiving such materials may be provided on the inside or on the outside of the frame.

Advantageously, it is also possible according to an exemplary embodiment of the invention to combine recesses in the internal region and in the external region of the frame, especially when it becomes useful to insert various elements into the frame which may or may not be constituent components of the latter.

The glass frames thus described according to the invention may be used as a peripheral spacer between two glass sheets in the production of plane and hermetically sealed glass envelopes, such as in the production of a display-type screen, for example a field-emission screen having cathodes consisting of carbon microspikes or nanotubes, or a screen of the flat cathode-ray (flat CRT) type, or the production of vacuum glazing or plane lamps.

According to the invention, the frame can be produced beforehand, especially by joining the various profiled elements together when the frame thus formed is sufficiently stiff to be handled without risk of damaging it.

According to an advantageous embodiment of the invention, the frame is produced at the same time as the product, such as a screen. In this embodiment, if elements have to be inserted into recesses provided for this purpose this can be done, for example in the case of getters, before assembly, or even during assembly, especially with regard to the use of angle brackets or hooping means.

During manufacture, profiled glass elements are joined together either by the assembly of complementary shapes, such as shapes of the mortise/tenon type, or by the use of other elements and more particularly of glass angle brackets, or by combining these two possibilities.

The mechanical integrity of the frame thus produced is obtained either simply because of the rubbing of the elements on one another, or by the use of other factors.

According to a variant of the invention, the mechanical integrity is obtained by inserting a complementary element, such as a metal wire, into a recess provided around the entire outer periphery of the frame, allowing the frame to be hooped.

According to another variant of the invention, at least part of the frame is melted. The composition of the profiled elements and the composition of the angle brackets, when present, may be chosen to have a low melting point, so that the temperature of these elements may be raised, resulting in melting and welding them together, and possibly sealing onto the two plane glass substrates when the entire product is produced at the same time. The temperature may be raised by placing the elements in a thermal enclosure or by any means known to those skilled in the art, and especially those mentioned above. The profiled elements may be produced from glass compositions sensitive to infrared, laser or microwave radiation, or provision may be made to insert elements into internal or external recesses, the elements being sensitive to one of these types of radiation, or else provision may be made to insert a heating wire into an outer recess in order to allow its electrical connection.

The profiled glass elements may be welded together by simply melting the angle brackets, especially when the frame is made before the screen is manufactured. Means for melting the angle brackets in such a case of course, are the same as those mentioned above.

The use of a frame according to the invention produced before being joined to the plane substrates advantageously may simplify the insertion of various elements into the recesses provided for this purpose.

When the frame is produced during a first operation, the invention advantageously provides for use of a sealing paste for fastening the frame to the two plane substrates.

According to another embodiment of the invention, provision is made to melt the frame, the latter being chosen to have a melting point below that of the plane substrates.

According to either of these embodiments of the invention, it is advantageous to provide local heating limited to the frame region, using one of the techniques already mentioned above. The use of local heating, limited to the frame region, makes it possible in particular to avoid damaging the various components, for example of a screen, which are deposited beforehand on the two glass sheets and generally are sensitive to heat treatment. According to an embodiment variant of the invention, the local heating is only heating complementary to the overall heating of the entire product raised to a temperature which can be withstood by all the materials without any risk of damaging them. This variant may make it possible, in particular, to increase the rate of temperature rise and therefore the productivity.

According to an embodiment variant of a frame according to the invention, the frame is entirely inserted between the two plane substrates in order to form the product, such as a screen.

According to another embodiment variant, only part of the frame is inserted between the two plane substrates; the frame then advantageously has at least one part which is able to bear on the edge of at least one substrate. Such a configuration may be particularly advantageous for producing vacuum glazing which requires no electrical connection. Furthermore, such a configuration makes it possible to limit the shear stresses which appear at the joining of the frame/plane substrate.

With regard to the dimensions of the frame, its height is advantageously designed to be less than that of the intended space between the two plane substrates when the frame and substrate are joined by disposing a sealing frit between them; this difference in dimensions is preferably between 50 and 300 microns.

In contrast, when it is intended to effect joining by melting the frame, the latter advantageously has a greater height than that finally desired for the distance separating the two plane substrates; this difference is preferably between 20 and 300 microns.

Preferably, the frame has two parallel faces, each intended to come into contact with the plane substrates; the width of these faces is preferably between 2 and 15 mm.

When the frame includes recesses, the height of these is advantageously between 0.3 and 12 mm. For applications of the FED screen type, the height of the recesses is advantageously between 0.3 and 4.5 mm, and preferably between 0.5 and 1.5 mm. For applications of the plane lamp type, the height of the recesses is advantageously between 1 and 12 mm and preferably between 1 and 4.5 mm.

When the frame includes recesses, the thickness of the glass on each side of the recess is greater than 0.3 mm and preferably greater than 1 mm.

Certain embodiment variants of the invention provide for the frame to be visible to the least extent possible, especially so as to optimize the viewing area, for example in the case of a screen. The frame produced according to the invention, for the various reasons mentioned above, and especially because of its stiffness or because it is produced simultaneously with that of the product, may be smaller in size compared with the known frames. Furthermore, the invention advantageously provides for at least those faces of the frame which are inserted between the plane substrates to be scattering. A scattering effect may be due to a frosted appearance which may, for example, be obtained by a chemical treatment of the profiled elements, such as an acid etch in a solution of ammonia fluoride and hydrochloric acid.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF PREFERRED EMBODIMENTS

Figure 1:
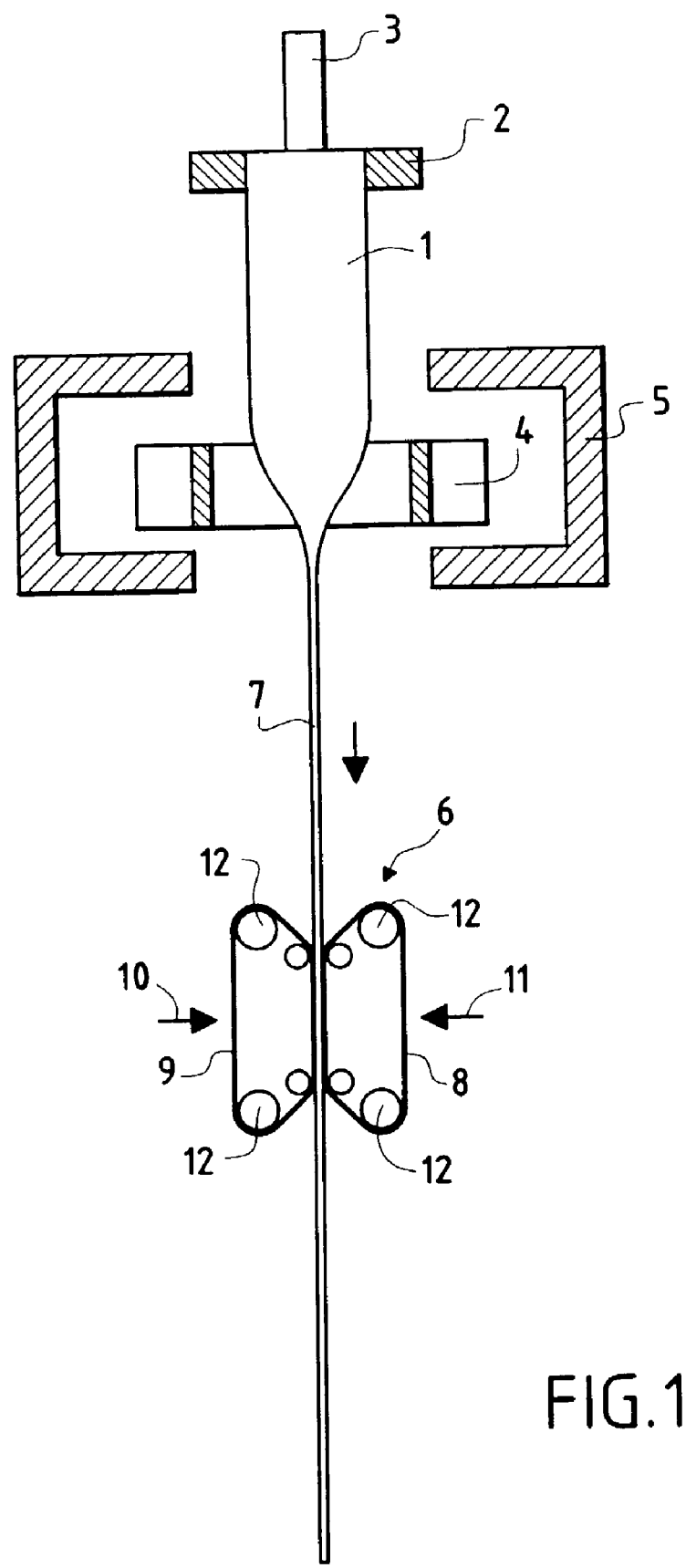
FIG. 1 shows a partial-cross sectional side view of an exemplary plant for producing profiled elements according to the present invention.

FIG. 1 is not drawn to scale, for clarification purposes, and shows a diagram of a plant for producing profiled elements which subsequently will be joined together to form a frame, according to an exemplary embodiment of the invention.

A preform 1, the cross-section of which is not precisely illustrated in this figure, is fastened to a support 2.

The support 2 is itself fastened to a mechanical system. This mechanical system, which may for example be a worm, makes it possible to give the preform 1 a vertical downward movement along the axis 3, the preform thus passing through a heating ring 4 approximately 70 mm in height.

This heating ring 4 is heated by low-voltage resistance heating and is slightly oval in shape. This allows better distribution of the heat around the preform to the point that the temperature control is made to plus or minus 0.1 degrees at 800° C.

The heating ring 4 is surrounded by an insulation refractory 5. A drawing device 6, placed beneath the heating ring at a distance of about 500 mm, is used to draw the preform 1 so as to obtain a glass rod or fibre 7.

The device 6 is composed of two driven belts 8, 9 on which lateral compressive forces 10, 11 are exerted. These compressive forces 10, 11 favor the drawing and are exerted by means (not shown) which are, for example, small hydraulic cylinders with adjustable pressure.

The drawing rate is directly linked to the speed of rotation of the rollers 12 which each drive the two driven belts 8, 9.

The driven belts 8, 9 are made of a material, for example silicone, preventing any slip on the glass and therefore allowing uniform drawing.

Using the drawing process, it is possible to keep almost the same profile, that is the same cross-sectional profile, between the preform 1 and the glass rod 7, with a homothetic ratio between the two.

Profiled elements according to the invention have thus been able to be produced using this manufacturing process. The profiles may then be joined together to form a frame.

FIGS. 2A to 2D show various cross-sections of profiles according to the invention, which can be obtained using the technique described with reference to FIG. 1. Of course, these examples must not be regarded as a limiting description of the invention. The examples in FIGS. 2A to 2D correspond to profiled elements intended to form frames which are preferably completely engaged between the two plane substrates forming the product, such as a display screen.

Figure 2A:
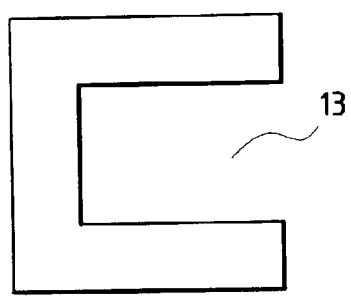
FIGS. 2A to 2D show exemplary cross-sections of profiled elements for producing frames according to the present invention.

Profiled elements whose cross-section corresponds to FIG. 2A, for example, may be joined together to form a complete frame; according to an embodiment variant, they may be joined together to form a peripheral recess 13 facing the inside of the frame formed. According to a second variant, they are joined together so that the recess 13 is facing the outside of the frame formed. According to either of these variants, the profiled elements may be joined together by inserting glass angle brackets in the recesses 13. According to either of the variants, the angle brackets will therefore be either fitted on the inside of the frame or on the outside of the frame. These glass angle brackets may, for example, be obtained using the technique described in FIG. 1.

As already mentioned, the peripheral recess 13 may allow the insertion of other elements which may or may not contribute to the formation of the frame. For example, such an element may be a hooping, possibly heating, wire which helps to stiffen the frame when the peripheral recess is on the outside, or a getter which maintains the desired vacuum when the peripheral recess is on the inside.

Figure 2B:
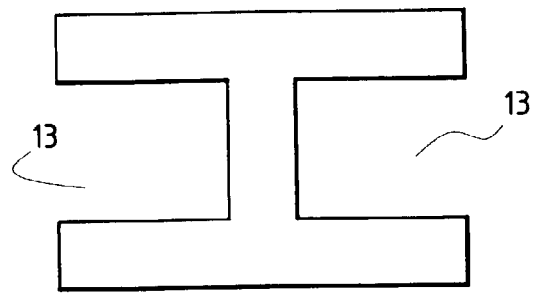

The cross-section shown in FIG. 2B illustrates profiled elements similar to the previous figure, which when joined together such as by means of angle brackets, have the various abovementioned advantages associated with the presence of internal and external recesses.

It is also possible to combine one or more profiled elements corresponding to FIG. 2A with one or more profiled elements corresponding to FIG. 2B, for example, when the simultaneous presence over a length of the frame of internal and external recesses is not required over the entire periphery.

Figure 2C:
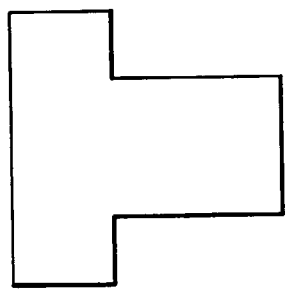

The cross-section shown in FIG. 2C corresponds to a profiled element which can be combined with elements shown in FIG. 2A or 2B according to the abovementioned mortise-and-tenon fitting principle.

Figure 2D:
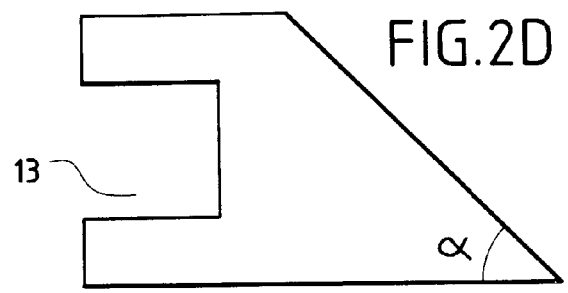

FIG. 2D illustrates a cross-section of a profiled element more particularly suitable for the production of a frame for plane lamps, the profiled element making it possible to increase the illumination uniformity in the area close to the frame when the angle a is between 30 and 60°.

The cross-sections shown in FIGS. 3A to 3D correspond to profiled elements which have, in common, a projection 14. These profiled elements can be used according to the abovementioned principle which consists in introducing, between the plane substrates, only part of the frame formed by these profiled elements; the plane substrates again rest on the surfaces of the projection 14.

Figure 3A:
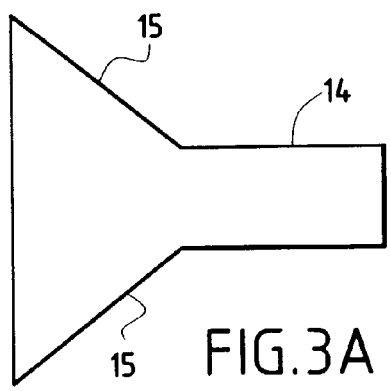
FIGS. 3A to 3D show additional exemplary cross-sections of profiled elements for producing frames according to the present invention.
Figure 3B:
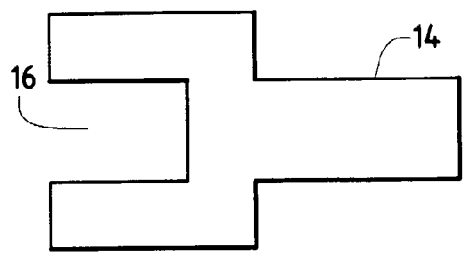
Figure 3C:
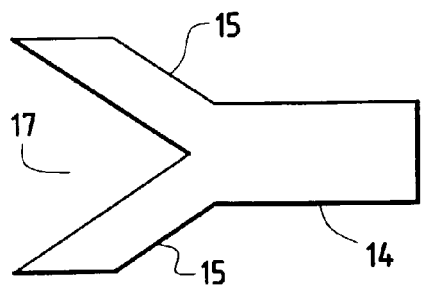
Figure 3D:
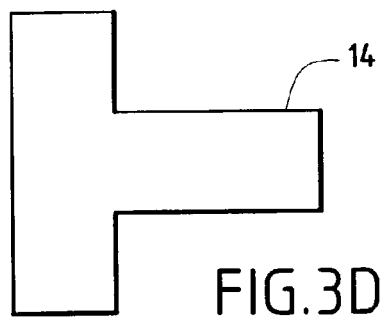

Such profiled elements as shown in FIGS. 3A and 3C may include bevelled regions 15 in order to allow the plane substrates to be correctly positioned, with the plane substrates themselves advantageously having complementary bevels.

Such elements of FIGS. 3B and 3C may also have recesses 16, 17, which then face the outside of the frame, making it possible, for example, for angle brackets to be present.

Figure 4:
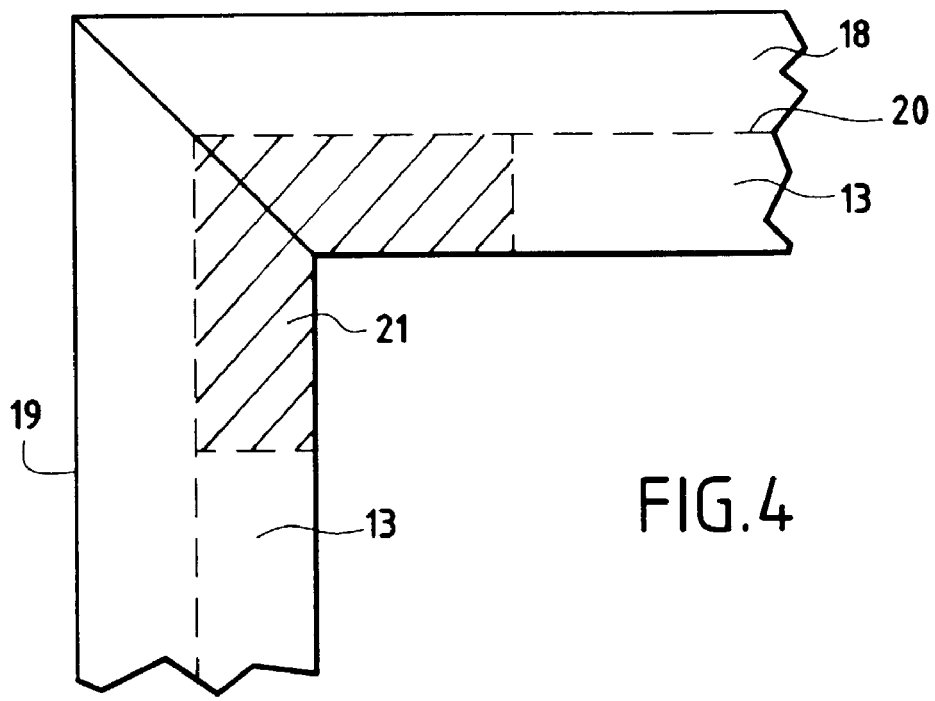
FIG. 4 shows a side view of an exemplary embodiment of two profiled elements joined together.

FIG. 4 illustrates an example of two profiled elements 18, 19 joined together, the elements having the cross-section shown in FIG. 2A and are positioned so that the recess 13, shown by the dotted line 20, faces the inside of the frame which will be formed, for example, from four of these profiled elements. Recess 13 houses an angle bracket 21. According to the embodiment shown here, the ends of the profiled elements have been angled at 45°. A frame produced in this way is more particularly intended to be completely inserted between the peripheries of the two plane substrates.

Figure 5:
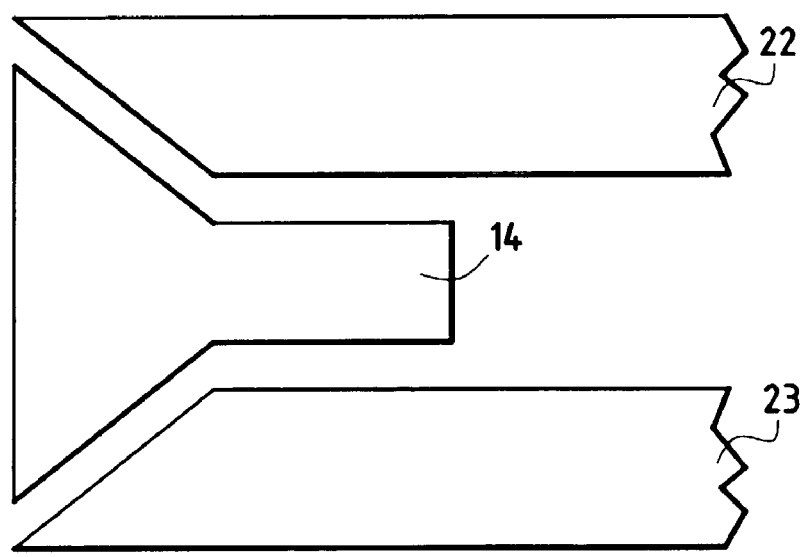
FIG. 5 shows a side view of an exemplary application of profiled elements such as those of FIG. 3.
Figure 6:
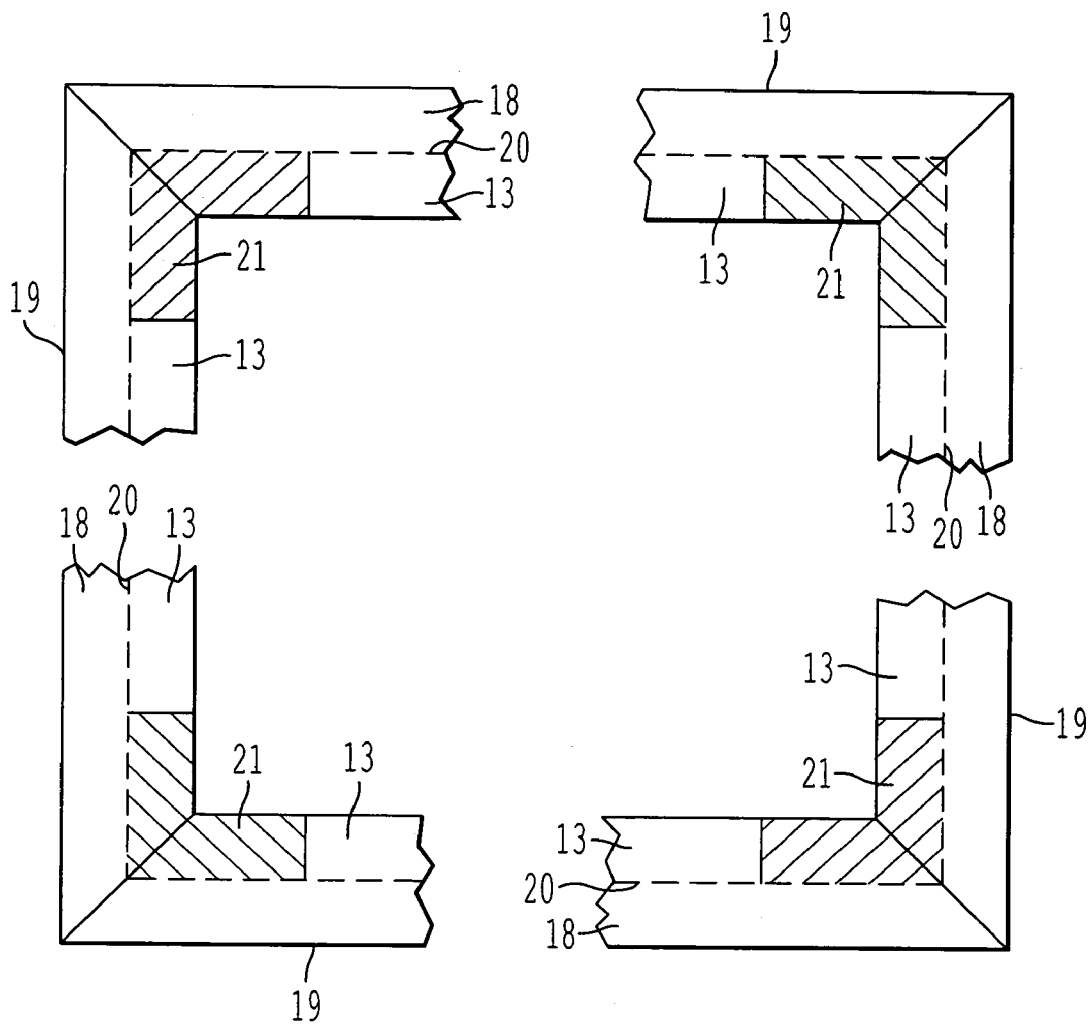
FIG. 6 shows a perspective view of the proximately peripheral glass frame and glass spacer, including angle brackets.
Figure 7:
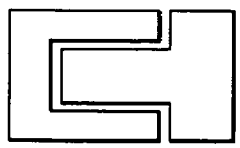
FIG. 7 shows a cross-sectional view of two profiled elements, which are shown in FIGS. 2A and 2C, that are joined together according to the mortise-and-tenon fitting principle.

FIG. 5 illustrates the use of profiled elements such as those in FIG. 3 in which only the projection 14 is inserted between the plane substrates 22 and 23.

The various profiled elements thus described make it possible to produce frames according to the invention which may, simultaneously with or subsequently to their production, be combined with plane substrates using the various techniques mentioned above, making it possible to obtain a perfect vacuum-type seal which will allow the subsequent creation of the vacuum required for the envisaged applications.

What is claimed is:

1. An article, comprising:
   a glass frame that contacts the periphery of two plane glass substrates having a space therebetween;
   wherein the glass frame has lateral faces having a surface roughness less than 5 Å, the glass frame has a cross-section having a substantially polygonal profile with at least one re-entrant angle, and the glass frame is capable of defining the space between the two plane glass substrates.

2. The article of claim 1, wherein the glass frame is shaped as a parallelogram.

3. The article claim 1, wherein the glass frame comprises at least four profiled glass elements.

4. The article of claim 3, wherein two profiled elements are disposed adjacent to one another and are configured and dimensioned with complementary shapes allowing them to fit together.

5. The article of claim 3, wherein the glass frame comprises corners that are at least partly formed by angle brackets associated with the profiled elements.

6. The article of claim 5, wherein the angle brackets are formed of glass.

7. The article of claim 6, wherein the glass frame has a melting point below 500°C.

8. The article of claim 1, wherein the glass frame further comprises at least one recess extending over at least part of the length of an at least one side of the frame.

9. The article claim 1, wherein the glass frame further comprises sides each having a constant cross-section.

10. The article of claim 6, wherein the glass angle brackets have a melting point below 500° C.

11. The article of claim 6, wherein both the glass frame and the glass angle brackets have a melting point below 500° C.

12. The article of claim 1, wherein the space between the two plane glass substrates is under vacuum.

13. The article of claim 1, wherein the surface roughness of the lateral faces of the glass frame is about 2 Å.

14. An article, comprising:
- a glass spacer that contacts the periphery of two plane glass substrates having a space therebetween;
- wherein the glass spacer comprises first and second glass profiled elements each having lateral faces having a surface roughness less than 5 Å, and each profiled element has a cross-section having at least one re-entrant angle;
- wherein the first and second glass profiled elements are coupled together proximate free ends thereof so that the re-entrant angles are adjacent to each other; and
- wherein the glass spacer is capable of defining the space between the two plane glass substrates.

15. The article of claim 14, wherein the glass spacer comprising each of the first and second glass profiled elements comprises a recess which includes the at least one re-entrant angle.

16. The article of claim 15, further comprising an angle bracket disposed in the recesses of the first and second glass profiled elements.

17. The article of claim 16, wherein the angle bracket is formed of glass.

18. The article of claim 15, wherein each free end is oriented at an angle of 45° with respect to a side of one of the glass profiled elements.

19. The article of claim 15, wherein each glass profiled element has a length and each recess extends over at least part of the length.

20. The article of claim 15, further comprising an angle bracket, wherein the recesses of the first and second profiled elements intersect and the angle bracket is disposed in the recesses where the recesses intersect.

21. The article of claim 15, wherein each recess defines a region extending between 0.3 mm and 12 mm.

22. The article of claim 15, wherein each recess defines a region extending between 0.3 mm and 4.5 mm.

23. The article of claim 15, wherein each recess defines a region extending between 0.5 mm and 1.5 mm.

24. The article of claim 15, wherein each recess defines a region extending between 1 mm and 12 mm.

25. The article of claim 15, wherein each recess defines a region extending between 1 mm and 4.5 mm.

26. The article of claim 15, wherein each recess is defined between spaced glass portions, with each glass portion having a thickness greater than 0.3 mm.

27. The article of claim 15, wherein each recess is defined between spaced glass portions, with each glass portion having a thickness greater than 1 mm.

28. The article of claim 15, wherein each glass profiled element further comprises two parallel portions.

29. The article of claim 28, wherein the parallel portions define a width therebetween of 2 mm to 15 mm.

30. The article of claim 15, wherein each of the first and second glass profiled elements comprises a second recess.

31. The article of claim 15, further comprising third and fourth glass profiled elements, wherein the first, second, third, and fourth glass profiled elements are coupled together to form a frame around the space.

32. The article of claim 31, wherein the frame is in a shape of a parallelogram.

33. The article of claim 31, wherein the recesses communicate with the space.

34. The article of claim 14, wherein the glass profiled elements further comprise faces that provide scattering.

35. The article of claim 14, wherein each of the first and second profiled elements comprise a projection which partly defines one of the at least one re-entrant angles.

36. The article of claim 14, wherein the space between the two plane glass substrates is under vacuum.

37. The article of claim 14, wherein the surface roughness of the lateral faces of the profiled elements is about 2 Å.

* * * * *